(12) United States Patent
Wichmann et al.

(10) Patent No.: US 8,453,462 B2
(45) Date of Patent: *Jun. 4, 2013

(54) METHOD OF OPERATING A STOICHIOMETRIC EXHAUST GAS RECIRCULATION POWER PLANT

(75) Inventors: Lisa Anne Wichmann, Greenville, SC (US); Daniel David Snook, Greenville, SC (US); Samuel David Draper, Greenville, SC (US); Noémie Dion Ouellet, Greenville, SC (US); Scott Allen Rittenhouse, Columbus, IN (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/217,658

(22) Filed: Aug. 25, 2011

(65) Prior Publication Data
US 2012/0023962 A1  Feb. 2, 2012

(51) Int. Cl.
*F02C 9/00* (2006.01)
*F02C 7/08* (2006.01)

(52) U.S. Cl.
USPC .......................................... 60/773; 60/39.52

(58) Field of Classification Search
USPC .................. 60/39.52, 39.5, 39.182, 773, 775, 60/806
See application file for complete search history.

(56) References Cited

U.S. PATENT DOCUMENTS

| | | | |
|---|---|---|---|
| 2,621,475 A | 12/1952 | Loy | |
| 2,646,663 A | 7/1953 | Sedille | |
| 3,685,287 A | 8/1972 | Dooley | |
| 3,771,969 A | 11/1973 | Scheitlin | |
| 3,866,411 A * | 2/1975 | Marion et al. | 60/780 |
| 3,875,380 A | 4/1975 | Rankin | |
| 3,949,548 A | 4/1976 | Lockwood, Jr. | |
| 4,267,692 A | 5/1981 | Earnest | |
| 4,271,664 A | 6/1981 | Earnest | |
| 4,313,300 A | 2/1982 | Wilkes et al. | |

(Continued)

FOREIGN PATENT DOCUMENTS

| | | |
|---|---|---|
| EP | 1731833 A1 | 12/2006 |
| EP | 2078827 A1 | 7/2009 |
| EP | 2206959 A2 | 7/2010 |

OTHER PUBLICATIONS

Supplemental Disclosure Under 37 C.F.R. § 1.56 dated Apr. 30, 2012 for U.S. Appl. No. 13/217,658.

(Continued)

*Primary Examiner* — Gerald Sung
(74) *Attorney, Agent, or Firm* — Sutherland Asbill & Brennan LLP

(57) ABSTRACT

At least one main air compressor makes a compressed ambient gas flow. The compressed ambient gas flow is delivered to a turbine combustor at a pressure that is greater than or substantially equal to an output pressure delivered to the turbine combustor from a turbine compressor as at least a first portion of a recirculated gas flow. A fuel stream is delivered to the turbine combustor, and a combustible mixture is formed and burned, forming the recirculated gas flow. A turbine power is produced that is substantially equal to at least a power required to rotate the turbine compressor. At least a portion of the recirculated gas flow is recirculated through a recirculation loop. An excess portion of the recirculated gas flow is vented or a portion of the recirculated gas flow bypasses the turbine combustor or both.

17 Claims, 2 Drawing Sheets

U.S. PATENT DOCUMENTS

| Number | Kind | Date | Inventor | Ref |
|---|---|---|---|---|
| 4,330,038 | A | 5/1982 | Soukup et al. | |
| 4,434,613 | A | 3/1984 | Stahl | |
| 4,492,085 | A | 1/1985 | Stahl et al. | |
| 4,528,811 | A | 7/1985 | Stahl | |
| 4,533,314 | A | 8/1985 | Herberling | |
| 4,561,245 | A | 12/1985 | Ball | |
| 4,566,267 | A | 1/1986 | Muller et al. | |
| 5,165,606 | A | 11/1992 | Pelet | |
| 5,341,636 | A | 8/1994 | Paul | |
| 5,361,576 | A | 11/1994 | Muller | |
| 5,400,587 | A | 3/1995 | Keler et al. | |
| 5,426,932 | A | 6/1995 | Morihara et al. | |
| 5,557,919 | A | 9/1996 | Althaus | |
| 5,564,896 | A | 10/1996 | Beeck et al. | |
| 5,584,182 | A | 12/1996 | Althaus et al. | |
| 5,595,059 | A * | 1/1997 | Huber et al. | 60/780 |
| 5,674,066 | A | 10/1997 | Hausermann et al. | |
| 5,724,805 | A | 3/1998 | Golomb et al. | |
| 5,794,431 | A | 8/1998 | Utamura et al. | |
| 5,809,768 | A | 9/1998 | Uematsu et al. | |
| 5,822,992 | A | 10/1998 | Dean | |
| 6,050,082 | A | 4/2000 | Leonard et al. | |
| 6,082,093 | A | 7/2000 | Greenwood et al. | |
| 6,105,362 | A | 8/2000 | Ohtomo et al. | |
| 6,202,400 | B1 | 3/2001 | Utamura et al. | |
| 6,256,976 | B1 | 7/2001 | Kataoka et al. | |
| 6,269,624 | B1 | 8/2001 | Frutschi et al. | |
| 6,289,666 | B1 * | 9/2001 | Ginter | 60/775 |
| 6,338,240 | B1 * | 1/2002 | Endo et al. | 60/773 |
| 6,363,709 | B2 | 4/2002 | Kataoka et al. | |
| 6,430,915 | B1 | 8/2002 | Wiant et al. | |
| 6,622,470 | B2 * | 9/2003 | Viteri et al. | 60/39.52 |
| 6,637,183 | B2 | 10/2003 | Viteri et al. | |
| 6,848,249 | B2 * | 2/2005 | Coleman et al. | 60/39.17 |
| 6,851,266 | B2 | 2/2005 | Liebig | |
| 6,868,677 | B2 | 3/2005 | Viteri et al. | |
| 6,910,335 | B2 | 6/2005 | Viteri et al. | |
| 7,007,487 | B2 | 3/2006 | Belokon et al. | |
| 7,032,388 | B2 | 4/2006 | Healy | |
| 7,089,743 | B2 * | 8/2006 | Frutschi et al. | 60/772 |
| 7,127,898 | B2 | 10/2006 | Healy | |
| 7,383,686 | B2 | 6/2008 | Aycock et al. | |
| 7,490,472 | B2 * | 2/2009 | Lynghjem et al. | 60/772 |
| 7,503,178 | B2 | 3/2009 | Bucker | |
| 7,516,609 | B2 | 4/2009 | Agnew | |
| 7,726,114 | B2 * | 6/2010 | Evulet | 60/39.37 |
| 7,739,864 | B2 | 6/2010 | Finkenrath et al. | |
| 7,895,822 | B2 | 3/2011 | Hoffmann et al. | |
| 2003/0051481 | A1 | 3/2003 | Priestley | |
| 2004/0011057 | A1 | 1/2004 | Huber | |
| 2004/0134194 | A1 | 7/2004 | Roby et al. | |
| 2004/0200205 | A1 | 10/2004 | Frutschi et al. | |
| 2005/0028529 | A1 | 2/2005 | Bartlett et al. | |
| 2005/0150229 | A1 * | 7/2005 | Baer et al. | 60/772 |
| 2007/0006592 | A1 | 1/2007 | Balan et al. | |
| 2007/0034171 | A1 | 2/2007 | Griffin et al. | |
| 2007/0068167 | A1 | 3/2007 | Patel et al. | |
| 2007/0125063 | A1 | 6/2007 | Evulat | |
| 2007/0125064 | A1 | 6/2007 | Sonoda et al. | |
| 2007/0125091 | A1 | 6/2007 | Roby et al. | |
| 2007/0220896 | A1 | 9/2007 | Varatharajan et al. | |
| 2008/0010967 | A1 * | 1/2008 | Griffin et al. | 60/39.182 |
| 2008/0104938 | A1 | 5/2008 | Finkenrath et al. | |
| 2008/0104939 | A1 | 5/2008 | Hoffmann et al. | |
| 2008/0120960 | A1 * | 5/2008 | Agnew | 60/39.52 |
| 2008/0309087 | A1 | 12/2008 | Evulet et al. | |
| 2009/0199566 | A1 | 8/2009 | Lebas et al. | |
| 2009/0218821 | A1 | 9/2009 | Elkady et al. | |
| 2009/0280003 | A1 | 11/2009 | Schriner et al. | |
| 2009/0284013 | A1 * | 11/2009 | Anand et al. | 290/52 |
| 2009/0301054 | A1 * | 12/2009 | Simpson et al. | 60/39.15 |
| 2010/0018218 | A1 | 1/2010 | Riley et al. | |
| 2010/0115960 | A1 | 5/2010 | Brautsch et al. | |
| 2010/0126181 | A1 | 5/2010 | Ranasinghe et al. | |
| 2010/0170218 | A1 | 7/2010 | Eluripati et al. | |
| 2010/0180565 | A1 | 7/2010 | Draper | |
| 2011/0138766 | A1 | 6/2011 | ELKady et al. | |
| 2011/0289898 | A1 | 12/2011 | Hellat et al. | |

OTHER PUBLICATIONS

Bandar Duraya Al-Anazi, "Enhanced Oil Recovery Techniques and Nitrogen Injection," CSEG Recorder, 2007, 28-33.

Supplemental Disclosure under 37 CFR 1.56 for U.S. Appl. No. 13/217,658, filed Oct. 25, 2012.

* cited by examiner

METHOD OF OPERATING A STOICHIOMETRIC EXHAUST GAS RECIRCULATION POWER PLANT

BACKGROUND OF THE INVENTION

The subject matter of the present disclosure relates generally to the field of electric power plants, and more particularly to methods of operating stoichiometric exhaust gas recirculation (SEGR) turbine systems. Various types of gas turbine systems are known and in use for electricity generation in power plants. Typically, the gas turbine systems include a turbine compressor for compressing an air flow and a turbine combustor that combines the compressed air with a fuel and ignites the mixture to generate an exhaust gas. The exhaust gas may then be expanded through a turbine, thereby causing the turbine to rotate, which in turn may be connected to a turbine generator via a turbine shaft, for power generation. Gas turbines have traditionally used excess air within the combustion process to control turbine temperatures and manage undesirable emissions. This often results in an exhaust stream with large amounts of excess oxygen.

Accordingly, there exists a need for a power plant arrangement that uses a gas turbine system that may operate without an exhaust stream with large amounts of excess oxygen. Furthermore, it would be desirable for the power plant arrangement to provide for the option to further reduce emissions through treatment of exhaust gases and/or to recover streams of carbon dioxide, nitrogen, and water.

BRIEF DESCRIPTION OF THE INVENTION

In one aspect, a method for operating a power plant at constant speed no load is provided. The method comprises compressing ambient air with at least one main air compressor to make a compressed ambient gas flow having a compressed ambient gas flow rate. At least a first portion of the compressed ambient gas flow is delivered from the at least one main air compressor to a turbine combustor at a pressure that is greater than or substantially equal to an output pressure delivered to the turbine combustor from a turbine compressor as at least a first portion of a recirculated gas flow having a recirculated gas flow rate. A fuel stream is delivered to the turbine combustor with a fuel flow rate, wherein the fuel flow rate, the compressed ambient gas flow rate, and the recirculated gas flow rate are sufficient to maintain combustion. At least a first portion of the compressed ambient gas flow is mixed with the at least a first portion of the recirculated gas flow and with the fuel stream in the turbine combustor to form a combustible mixture. The combustible mixture is burned in the turbine combustor to form the recirculated gas flow. A turbine, connected to the turbine combustor, is driven using the recirculated gas flow, such that the turbine and a turbine compressor rotate, and produce a turbine power that is substantially equal to at least a power required to rotate the turbine compressor. At least a portion of the recirculated gas flow is recirculated through a recirculation loop from the turbine to the turbine compressor. An excess portion of the recirculated gas flow is vented between an output of the turbine compressor and an input to the turbine compressor or the turbine combustor is bypassed by at least a second portion of the recirculated gas flow as a bypass flow having a bypass flow rate or both.

In another aspect, a method for operating a power plant is provided. The method comprises compressing ambient air with at least one main air compressor to make a compressed ambient gas flow having a compressed ambient gas flow rate. At least a first portion of the compressed flow is delivered from the at least one main air compressor to a turbine combustor. The at least a first portion of the compressed ambient gas flow is mixed with at least a first portion of a recirculated gas flow and with a fuel stream to form a combustible mixture in the turbine combustor. The combustible mixture is burned in the turbine combustor to form the recirculated gas flow. A turbine, connected to the turbine combustor, is driven using the recirculated gas flow, such that the turbine and a turbine compressor rotate, and produce a turbine power. At least a portion of the recirculated gas flow is recirculated through a recirculation loop, wherein the recirculated gas flow is recirculated from the turbine to the turbine compressor. An excess portion, if any, of the recirculated gas flow is vented between an output of the turbine compressor and an input to the turbine compressor or the turbine combustor is bypassed by at least a second portion of the recirculated gas flow as a bypass flow having a bypass flow rate or both.

Additional aspects will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

These and other features, aspects, and advantages of the present invention will become better understood when the following detailed description is read with reference to the accompanying drawings, where the components are not necessarily to scale, and in which corresponding reference numerals designate corresponding parts throughout the drawings, wherein.

DETAILED DESCRIPTION OF THE INVENTION

Figure 1:
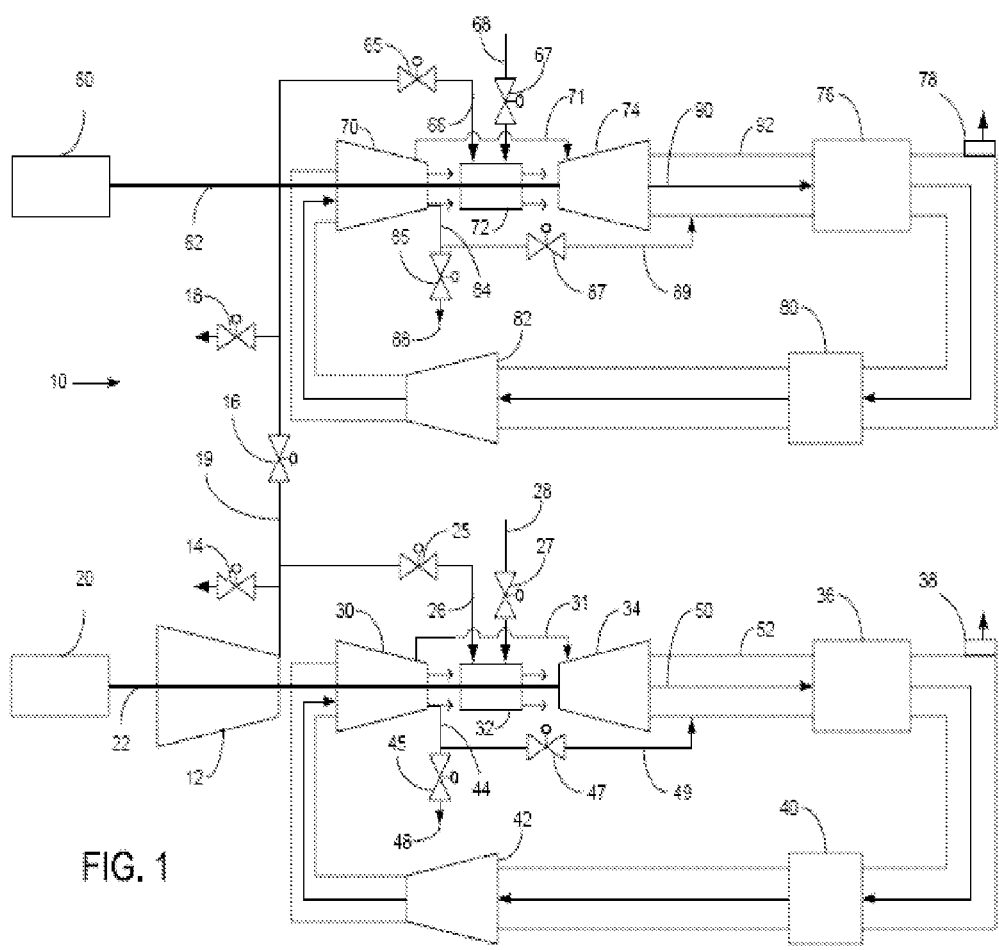
FIG. 1 is a diagrammatical illustration of an exemplary power plant arrangement 10 in accordance with an embodiment of the present invention.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment," "an embodiment," or "embodiments" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Recent requirements in the power generation industry have necessitated the development of a gas turbine arrangement that may be configured to consume substantially all of the oxygen in the air working fluid to produce an essentially oxygen-free exhaust stream. Such an exhaust stream may be more easily suited to emissions reductions using $NO_x$ catalysts. Additionally, such an exhaust stream may be better suited to post combustion carbon capture solutions due to the low oxygen concentrations. Furthermore, a largely oxygen-free exhaust stream may be more easily suited to enhanced oil recovery applications.

A substantially oxygen-free exhaust from a gas turbine may be accomplished by stoichiometric burning in the combustion system. That is, the oxygen-containing fresh air supply may be matched to the fuel flow such that the combustion process operates at near combustion stoichiometry.

A stoichiometric combustion reaction of methane and oxygen is illustrated below:

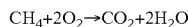

$$CH_4 + 2O_2 \rightarrow CO_2 + 2H_2O$$

Stoichiometric combustion may result in gas temperatures much too high for the materials and cooling technology employed in gas turbine engines. In order to reduce those high temperatures, a portion of the gas turbine exhaust products may be recirculated back to the combustion system to dilute the combustion temperatures. Ideally, this diluent gas should also be significantly oxygen-free so as to not introduce additional oxygen into the system and thereby reduce the advantages of stoichiometric combustion. The gas turbine application using stoichiometric combustion and recirculated exhaust gas is referred to as Stoichiometric Exhaust Gas Recirculation (SEGR).

The SEGR system may use a supply of high pressure air fed directly into the combustion process to provide the oxygen for combustion. This air may be supplied by an auxiliary compressor. In practice, the ability of an auxiliary compressor to provide air at the pressure and flow rate required by the SEGR gas turbine will not be matched across all operating ranges of load and ambient temperature experienced by the system. The auxiliary compressor may allow the compressor to provide more air at times than is required by the gas turbine. Further, the auxiliary compressor may be designed with the capability to always provide more air than is required by the gas turbine. In some situations, it may be necessary to discharge some of the air compressed by the auxiliary compressor to the atmosphere.

As discussed in detail below, embodiments of the present invention may function to minimize emissions in gas turbine power plant systems by using an SEGR cycle that may enable substantially stoichiometric combustion reactions for power production. The SEGR gas turbine may be configured so as to provide a low oxygen content exhaust. This low oxygen content exhaust may be used with an $NO_x$ reduction catalyst to provide an exhaust stream that may also be free of $NO_x$ contaminants.

Embodiments of the presently disclosed subject matter include the ability to start up a gas turbine power plant that may use an SEGR cycle by first bringing the one or more gas turbines of the power plant up to constant speed no load operation. As used herein, the term "constant speed no load" means operating a gas turbine at a constant rotational speed (e.g., >1000 rpm) and producing enough power to operate at least the turbine compressor without any applied electrical load from an attached generator unit. In some embodiments, a gas turbine operating at constant speed no load may have a turbine that is running at full speed but that may not be connected to a power grid.

Power Plant Arrangement

Turning now to the drawings and referring first to FIG. 1 an exemplary power plant arrangement 10 is illustrated. The exemplary power plant arrangement 10 may include a main air compressor 12 for compressing ambient air into at least a first portion of a compressed ambient gas flow 26. Further, the power plant arrangement 10 may include a turbine combustor 32 that may be fluidly connected to the main air compressor 12. The flow of the at least a first portion of the compressed ambient gas flow 26 to the turbine combustor 32 may be regulated by an air injection valve 25. An excess portion of the at least a first portion of the compressed ambient gas flow 26 may be vented between an output of the main air compressor 12 and an input to a turbine combustor 32. In some embodiments, the at least a first portion of the compressed ambient gas flow 26 may be vented to the atmosphere via a variable bleed valve 14.

The turbine combustor 32 may be configured to receive the at least a first portion of the compressed ambient gas flow 26 from the main air compressor 12, at least a first portion of a recirculated gas flow 50 from a turbine compressor 30, and a fuel stream 28, to form a combustible mixture and to burn the combustible mixture to generate the recirculated gas flow 50. In some embodiments, the fuel stream 28 may be regulated by a gas control valve 27 to deliver a fuel flow rate. In addition, the power plant arrangement 10 may include a turbine 34 located downstream of the turbine combustor 32. The turbine 34 may be configured to expand the recirculated gas flow 50 and may drive an external load such as a turbine generator 20 via a turbine shaft 22 to generate electricity. In the illustrated embodiment 10, the main air compressor 12 and the turbine compressor 30 may be driven by the power generated by the turbine 34 via the turbine shaft 22.

In some embodiments, the main air compressor 12 may further comprise adjustable inlet guide vanes to control the flow of air into the main air compressor 12. The inlet guide vanes of the main air compressor may be used to regulate the pressure and flow rate of the at least a first portion of the compressed ambient gas flow 26 that is delivered to the turbine combustor 32. Additionally, the turbine compressor 30 may further comprise adjustable inlet guide vanes to control the flow of air into the turbine compressor 30. The inlet guide vanes of the turbine compressor 30 may be used to regulate the output pressure and flow rate delivered to the turbine combustor 32 from the turbine compressor 30 as the at least a first portion of the recirculated gas flow 50.

As used herein, the term "recirculated gas flow" refers to the gas flow generated by the burning of the combustible mixture in the turbine combustor 32 and flowing through a recirculation loop 52. In some embodiments, the recirculated gas flow may have a low oxygen content. The term "low oxygen content" refers to an oxygen content of below about 5 vol %, below about 2 vol %, or below about 1 vol %.

As used herein, the term "gas turbine assembly" refers to all listed components of the power plant arrangements except for the main air compressor 12. In embodiments comprising multiple main air compressors, the term "gas turbine assembly" refers to all listed components of the power plant arrangements except for the multiple main air compressors.

In some embodiments, the recirculated gas flow 50 may be directed from the turbine 34 through the recirculation loop 52 to a heat recovery steam generator 36 for the generation of steam. A steam turbine may be further configured to generate additional electricity using the steam from the heat recovery steam generator 36, and the steam turbine may be connected to a steam generator. In some embodiments, the heat recovery steam generator 36, in conjunction with the steam turbine and the steam generator, may be configured to generate additional electricity when the temperature of the recirculated gas flow 50 is in the range from about 200° C. to about 700° C., from about 260° C. to about 600° C., or from about 300° C. to about 550° C. In some embodiments, the steam turbine may be arranged to be connected to the turbine shaft 22. The recirculated gas flow 50 may then be directed back into the recirculation loop 52 to a recirculated gas flow cooler 40. In still other embodiments, the recirculation loop 52 may not contain a heat recovery steam generator 36 and the recirculated gas flow 50 may instead be introduced directly into the recirculated gas flow cooler 40 upon exit from the turbine 34. In other embodiments, the recirculation loop 52 may not comprise the recirculated gas flow cooler 40.

In some embodiments, the recirculated gas flow cooler 40 may be incorporated into the recirculation loop 52 anywhere downstream of the turbine 34. The recirculated gas flow cooler 40 may be configured to lower the temperature of the recirculated gas flow 50 to a suitable temperature for downstream delivery into the turbine compressor 30 via the recirculation loop 52. In some embodiments, a suitable temperature may be below about 66° C., below about 49° C., or below about 45° C.

In some embodiments, a blower 42 may be fluidly connected to the recirculation loop 52 upstream of the recirculated gas flow cooler 40. The blower 42 may be configured to increase the pressure of the recirculated gas flow 50 prior to delivery into the recirculated gas flow cooler 40 via the recirculation loop 52.

In some embodiments, the exemplary power plant arrangement 10 may include a bypass conduit 49 located downstream of the turbine compressor 30 and may be in fluid connection with a portion of the recirculated gas flow 50 via a turbine compressor exhaust 44. The bypass conduit 49 may be used to bypass the turbine combustor 32 with at least a portion of the turbine compressor exhaust 44 as bypass flow having a bypass flow rate. In some embodiments, a bypass flow through the bypass conduit 49 may be regulated by a turbine bypass valve 47. The turbine bypass valve 47 may be used to adjust a bypass flow rate through the bypass conduit 49. In some embodiments, the bypass conduit 49 may be used to bypass the turbine combustor 32 with at least a second portion of the recirculated gas flow 50.

In some embodiments, the bypass flow may be fluidly connected to the recirculation loop 52 downstream of the turbine 34. In still other embodiments, a portion of the bypass flow into the bypass conduit 49 may be extracted as an extraction flow 48 and may be regulated by an extraction valve 45.

In some embodiments, the extraction valve 45 may be fluidly connected to the bypass conduit 49 at a point that is either upstream of or downstream of the turbine bypass valve 47. In some embodiments, the extraction flow 48 may be fluidly connected to one or more additional processes. In some embodiments, the bypass extraction valve 45 may be fluidly connected to a gas separation system such as a carbon capture sequestration (CCS) system via the extraction flow 48. In still other embodiments, the gas separation system may produce a stream of concentrated carbon dioxide and concentrated nitrogen, both with a low oxygen content.

An excess portion of the recirculated gas flow 50 may be vented somewhere between an output of the turbine compressor 30 and an input to the turbine compressor 30. In some embodiments, a gas turbine vent to the atmosphere may be in fluid communication with the gas turbine assembly and may be located anywhere between an output of the turbine compressor 30 and an input of the turbine compressor 30. In some embodiments, the power plant arrangement 10 may include a damper door 38 connected to the recirculation loop 52. The damper door 38 may be opened to vent a portion of the recirculated gas flow 50 to the atmosphere. In some embodiments, an excess portion of the recirculated gas flow 50 may be vented from the bypass conduit 49.

In some embodiments, the gas turbine assembly may further comprise a secondary flow path 31 that may deliver at least a third portion of the recirculated gas flow 50 from the turbine compressor 30 to the turbine 34 as a secondary flow. The secondary flow may be used to cool and seal the turbine 34, including individual components of the turbine 34 such as the turbine shroud, the turbine nozzle, the turbine blade tip, the turbine bearing support housing, and the like. After cooling and sealing the turbine 34 and any individual turbine components, the secondary flow may be directed into the recirculation loop 52 downstream of the output of the turbine 34.

As illustrated by FIG. 1, in some embodiments, the turbine shaft 22 may be a "cold-end drive" configuration, meaning the turbine shaft 22 may connect to the generator 20 at the compressor end of the turbine assembly. In other embodiments, the turbine shaft 22 may be a "hot-end drive" configuration, meaning the turbine shaft 22 may connect to the generator 20 at the turbine end of the turbine assembly.

As used herein, the term "slave" is synonymous with the terms secondary, auxiliary, or additional. In the following embodiments, the term "slave" refers to the second of two gas turbine assemblies, but can also mean any additional gas turbine assemblies operated with a master gas turbine assembly such as is the second gas turbine assembly in the following embodiments.

In some embodiments, the main air compressor 12 may deliver compressed ambient gas to a slave turbine combustor 72 that may be fluidly connected to the main air compressor 12 via an inter-train conduit 19. The flow of the compressed ambient gas through the inter-train conduit 19 may be further regulated by an inter-train valve 16 to create at least a second portion of a compressed ambient gas flow 66. In some embodiments, the at least a second portion of the compressed ambient gas flow 66 may be vented to the atmosphere via a slave variable bleed valve 18. In some embodiments, the flow of the at least a second portion of the compressed ambient gas flow 66 to a slave turbine combustor 72 may be regulated by a slave air injection valve 65.

The slave turbine combustor 72 may be configured to receive the at least a second portion of the compressed ambient gas flow 66 from the main air compressor 12, a slave recirculated flow 90 from a slave turbine compressor 70, and a slave fuel stream 68, to form a slave combustible mixture and to burn the slave combustible mixture to generate the slave recirculated gas flow 90. In some embodiments, the slave fuel stream 68 may be regulated by a slave gas control valve 67 to deliver a slave fuel flow rate. In addition, the exemplary power plant arrangement 10 may include a slave turbine 74 located downstream of the slave turbine combustor 72. The slave turbine 74 may be configured to expand the slave recirculated gas flow 90 and may drive an external load such as a slave turbine generator 60 via a slave turbine shaft 62 to generate electricity.

In some embodiments, the slave turbine compressor 70 may further comprise adjustable inlet guide vanes to control the flow rate of air delivered to the slave turbine compressor 70. In some embodiments, the inlet guide vanes of the slave turbine compressor 70 may be used to regulate the flow rate and output pressure delivered to the slave turbine combustor 72 from the slave turbine compressor 70 as the slave recirculated gas flow 90.

As used herein, the term "slave recirculated gas flow" refers to the gas flow generated by the burning of the slave combustible mixture in the slave turbine combustor 72 and flowing through a slave recirculation loop 92. In some embodiments, the slave recirculated gas flow 90 may comprise a low oxygen content. The term "low oxygen content" refers to an oxygen content of below about 5 vol %, below about 2 vol %, or below about 1 vol %.

In some embodiments, the slave recirculated gas flow 90 may be directed from the slave turbine combustor 72 through the slave recirculation loop 92 to a slave heat recovery steam generator 76 for the generation of steam. A slave steam turbine may be further configured to generate additional electricity using the steam from the slave heat recovery steam generator 76, and the slave steam turbine may be connected to a slave steam generator. In some embodiments, the slave heat recovery steam generator 76, in conjunction with the slave steam turbine and the slave steam generator, may be configured to generate additional electricity when the temperature of the slave recirculated gas flow 90 is in the range from about 200° C. to about 700° C., from about 260° C. to about 600° C., or from about 300° C. to about 550° C. In some embodiments, the slave steam turbine may be arranged to be connected to the slave turbine shaft 62. The slave recirculated gas flow 90 may then be directed back into the slave recirculation loop 92 to a slave recirculated gas flow cooler 80. In still other embodiments, the recirculation loop 92 may not contain a slave heat recovery steam generator 76 and the slave recirculated gas flow 90 may instead be introduced directly into the slave recirculated gas flow cooler 80 upon exit from the slave turbine 74. In other embodiments, the slave recirculation loop 92 may not comprise the slave recirculated gas flow cooler 80.

The slave recirculated gas flow cooler 80 may be incorporated into the slave recirculation loop 92 anywhere downstream of the slave turbine 74. The slave recirculated gas flow cooler 80 may be configured to lower the temperature of the slave recirculated gas flow 90 to a suitable temperature for downstream delivery into the slave turbine compressor 70 via the slave recirculation loop 92. In some embodiments, a suitable temperature may be below about 66° C., below about 49° C., or below about 45° C.

In some embodiments, a slave blower 82 may be fluidly connected to the slave recirculation loop 92 upstream of the slave recirculated gas flow cooler 80. The slave blower 82 may be configured to increase the pressure of the slave recirculated gas flow 90 prior to delivery into the slave turbine compressor 70 via the slave recirculation loop 92.

In some embodiments, the exemplary power plant arrangement 10 may include a slave bypass conduit 89 located downstream of the slave turbine compressor 70 and in fluid connection with a portion of the slave recirculated gas flow 90 via a slave turbine compressor output flow 84. In some embodiments, a slave bypass flow through the slave bypass conduit 89 may be regulated by a slave turbine bypass valve 87. The slave turbine bypass valve 87 may be used to adjust the slave bypass flow rate through the slave bypass conduit 89. In some embodiments, at least a second portion of the slave recirculated gas flow 90 may bypass the slave turbine combustor 70 as a slave bypass flow having a slave bypass flow rate.

In some embodiments, the slave bypass flow may be fluidly connected to the slave recirculation loop 92 downstream of the slave turbine 74. In still other embodiments, a portion of the slave bypass flow into the slave bypass conduit 89 may be extracted as a slave extraction flow 88 and regulated by a slave extraction valve 85.

In some embodiments, the slave extraction valve 85 may be fluidly connected to the slave bypass conduit 89 at a point that is either upstream of or downstream of the slave turbine bypass valve 87. In some embodiments, the slave bypass flow may be delivered to one or more additional processes. In some embodiments, the slave bypass extraction valve 85 may be fluidly connected to a slave gas separation system such as a carbon capture sequestration (CCS) system via the slave extraction flow 88. In still other embodiments, the slave gas separation system may produce a stream of concentrated carbon dioxide and concentrated nitrogen, both with a low oxygen content.

In some embodiments, a slave gas turbine vent to the atmosphere may be in fluid communication with the slave gas turbine assembly and may be located anywhere between an output of the slave turbine compressor 70 and an input of the slave turbine compressor 70. In some embodiments, the power plant arrangement 10 may include a slave damper door 78 connected to the slave recirculation loop 92. The slave damper door 78 may be opened to vent a portion of the slave recirculated gas flow 90 to the atmosphere. In some embodiments, an excess portion of the slave recirculated gas flow 90 may be vented from the slave bypass conduit 89.

In some embodiments, the gas turbine assembly may further comprise a slave secondary flow path 71 that may deliver a third portion of the slave recirculated gas flow 90 from the slave turbine compressor 70 to the slave turbine 74 as a slave secondary flow. The slave secondary flow may be used to cool and seal the slave turbine 74, including individual components of the slave turbine 74 such as the turbine shroud, the turbine nozzle, the turbine blade tip, the turbine bearing support housing, and the like. After cooling and sealing the slave turbine 74 and any individual turbine components, the slave secondary flow may be directed into the slave recirculation loop 92 downstream of the slave turbine 74.

As illustrated by FIG. 1, in some embodiments, the slave turbine shaft 62 may be a "cold-end drive" configuration, meaning the slave turbine shaft 62 may connect to the slave generator 60 at the compressor end of the turbine assembly. In other embodiments, the slave turbine shaft 62 may be a "hot-end drive" configuration, meaning the slave turbine shaft 62 may connect to the slave generator 60 at the turbine end of the turbine assembly.

Figure 2:
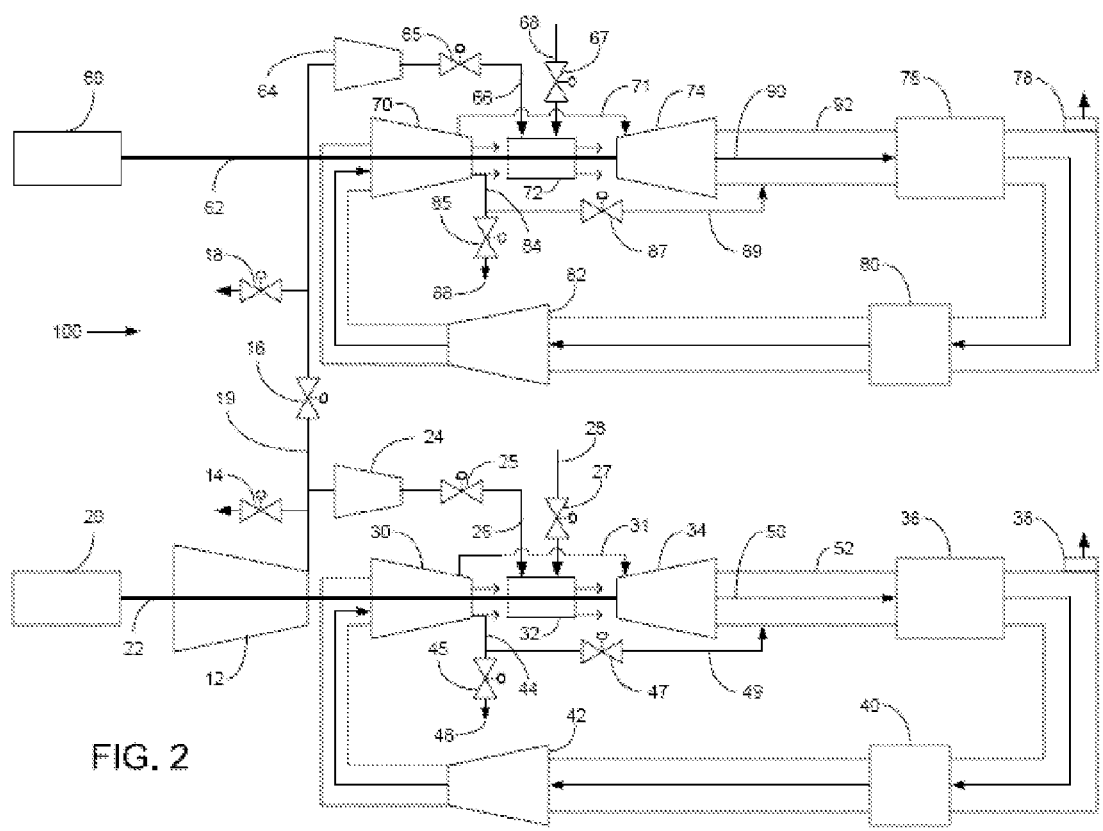
FIG. 2 is a diagrammatical illustration of an exemplary configuration 100 of the power plant arrangement 10 of FIG. 1 in accordance with an embodiment of the present invention.

FIG. 2 is a diagrammatical illustration of an exemplary configuration 100 of the exemplary power plant arrangement 10 of FIG. 1. As discussed with reference to FIG. 1, a booster compressor 24 may be incorporated downstream of and in fluid connection with the main air compressor 12 and upstream of and in fluid connection with the turbine combustor 32. The booster compressor 24 may further compress the at least a first portion of the compressed ambient gas flow 26 before delivery into the turbine combustor 32. Similarly, a slave booster compressor 64 may be incorporated downstream of and in fluid connection with the main air compressor 12 and upstream of and in fluid connection with the slave turbine combustor 72. The slave booster compressor 64 may further compress the at least a second portion of the compressed ambient gas flow 66 before delivery into the slave turbine combustor 72.

In some embodiments, the power plant arrangement comprises one gas turbine assembly. In other embodiments, the power plant arrangement comprises two gas turbine assemblies that are fluidly connected by the inter-train conduit 19. As used herein, the term "inter-train conduit" may refer to a fluid connection between two or more gas turbine assemblies and one or more main air compressors. In still other embodiments, the power plant arrangement comprises three or more gas turbine assemblies and one or more additional main air compressors, wherein the additional main air compressors are in fluid connection with each other and with the gas turbine assemblies. In yet other embodiments, the power plant arrangement is configured for substantially stoichiometric combustion. In still other embodiments, the power plant arrangement is configured for substantially zero emissions power production.

In some embodiments, the fuel stream 28 and/or the slave fuel stream 68 may comprise an organic gas, including but not limited to methane, propane, and/or butane. In still other embodiments, the fuel stream 28 and/or the slave fuel stream 68 may comprise an organic liquid, including but not limited to methanol and/or ethanol. In yet other embodiments, the fuel stream 28 and/or the slave fuel stream 68 may comprise a fuel source obtained from a solid carbonaceous material such as coal.

Method for Operating a Power Plant

In some embodiments, a method for operating an exemplary power plant arrangement 10 is provided, wherein the inter-train valve 16 may be closed. In operation, ambient air may be compressed with a main air compressor 12 to make at least a first portion of a compressed ambient gas flow 26 having a compressed ambient gas flow rate. The at least a first portion of the compressed ambient gas flow 26 may be delivered from the main air compressor 12 to the turbine combustor 32 and may be regulated by an air injection valve 25. The flow of the at least a first portion of the compressed ambient gas flow 26 may further be regulated by a variable bleed valve 14.

The at least a first portion of the compressed ambient gas flow 26 may be mixed, in the turbine combustor 32, with at least a first portion of a recirculated gas flow 50 and with the fuel stream 28 to form a combustible mixture. The flow rate of the fuel stream 28 may be regulated by a gas control valve 27. The combustible mixture may then be ignited and burned in the turbine combustor 32, thereby forming the recirculated gas flow 50 that may drive both the turbine 34 and the turbine compressor 30 to produce a turbine power.

As used herein, the terms "drive" and "driving" means the expansion of the recirculated gas flow 50 in the turbine 34 thereby causing the turbine 34 to rotate. The turbine 34 is connected to the turbine compressor 30 via the turbine shaft 22, and thus rotation of the turbine 34 causes rotation of the turbine compressor 30. The turbine shaft 22 may also rotate in a turbine generator 20 and may further generate electricity.

As illustrated by FIG. 1, in some embodiments, the turbine shaft 22 may be a "cold-end drive" configuration, meaning the turbine shaft 22 may connect to the generator 20 at the compressor end of the turbine assembly. In other embodiments, the turbine shaft 22 may be a "hot-end drive" configuration, meaning the turbine shaft 22 may connect to the generator 20 at the turbine end of the turbine assembly.

In some embodiments, at least a portion of the recirculated gas flow 50 may be recirculated through a recirculation loop 52. The recirculation loop 52 may fluidly connect the output of the turbine 34 with the input of the turbine compressor 30. The recirculated gas flow 50 may further pass through the heat recovery steam generator 36, the recirculated gas flow cooler 40, and the turbine blower 42 en route from the output of the turbine 34 to the input of the turbine compressor 30.

An excess portion, if any, of the recirculated gas flow 50 may be vented from the system at a location between an output of the turbine compressor 30 and an input to the turbine compressor 30. The venting step may be used to prevent over-pressurization of the gas turbine assembly. In some embodiments, the venting step may be used to reduce the pressure of the recirculated gas flow 50 that is delivered from the turbine compressor 30 to the turbine combustor 32. In some embodiments, the method of operation may further comprise opening a damper door 38, which may be fluidly connected to the recirculation loop 52, to the atmosphere.

In some embodiments, at least a portion of an exhaust of the turbine compressor 30 may bypass the turbine combustor 32 via the bypass conduit 49. As used herein, the "exhaust" of the turbine compressor 30 may be an output of the compressed recirculated gas flow 50 from the turbine compressor 30. A bypass flow rate may be regulated by the turbine bypass valve 47. In some embodiments, the bypass conduit 49 may deliver the bypass flow to the recirculation loop 52 downstream of the turbine 34. In some embodiments, at least a second portion of the recirculated gas flow 50 may bypass the turbine combustor 32 as a bypass flow having a bypass flow rate.

In some embodiments, a portion of the bypass flow into the bypass conduit 49 may be extracted as an extraction flow 48 and may be regulated by an extraction valve 45. In some embodiments, the extraction valve 45 may be fluidly connected to the bypass conduit 49 at a point that is either upstream of or downstream of the turbine bypass valve 47. In some embodiment, the bypass flow may be directed to a second process. In some embodiments, at least a portion of the bypass flow may be delivered to a gas separation system. In some embodiments, the bypass extraction valve 45 may be fluidly connected to a gas separation system such as a carbon capture sequestration (CCS) system via the extraction flow 48. In still other embodiments, the gas separation system may produce a stream of concentrated carbon dioxide and concentrated nitrogen, both with a low oxygen content.

In some embodiments, the gas turbine assembly may further comprise a secondary flow path 31 that may deliver at least a third portion of the recirculated gas flow 50 from the turbine compressor 30 to the turbine 34 as a secondary flow. The secondary flow may be used to cool and seal the turbine 34, including individual components of the turbine 34 such as the turbine shroud, the turbine nozzle, the turbine blade tip, the turbine bearing support housing, and the like. After cooling and sealing the turbine 34 and any individual turbine components, the secondary flow may be directed into the recirculation loop 52 near the output of the turbine 34.

In some embodiments, the turbine power generated by the combustion of the combustible mixture may be used to rotate a turbine shaft 22 that may be configured to generate electricity when rotated in the turbine generator 20. In some embodiments, the electricity may be generated using substantially stoichiometric combustion.

In still other embodiments, a method for operating an exemplary power plant configuration 100 is provided and may include the use of the booster compressor 24 which may be incorporated downstream of and in fluid connection with the main air compressor 12 and upstream of and in fluid connection with the turbine combustor 32. The booster compressor 24 may further compress the at least a first portion of the compressed ambient gas flow 26 before delivery into the turbine combustor 32. The exhaust of the booster compressor 24 may be delivered to the turbine combustor 32. In some embodiments, the exhaust of the booster compressor 24 may be regulated by the air injection valve 25.

Method for Operating a Power Plant at Constant Speed No Load

In another embodiment, a method for operating an exemplary power plant arrangement 10 at constant speed no load is provided, wherein the inter-train valve 16 may be closed.

Constant speed no load operation may consider several factors for operation. First, the power produced by the turbine 34 should be equal to the power consumed by the main air compressor 12 (if attached to the turbine shaft 22) plus the power consumed by the turbine compressor 30. Second, the exhaust gas temperature of the gas turbine assembly may be maintained at an appropriate temperature to enable the heat recovery steam generator 36 to operate. Third, the pressure of the at least a first portion of the compressed ambient gas flow 26 entering the turbine combustor 32 should be greater than or substantially equal to the pressure of the at least a first portion of the recirculated gas flow 50 entering the turbine combustor 32 from the turbine compressor 30. Fourth, there should be sufficient oxygen from the combination of the at least of first portion of the compressed ambient gas flow 26 and the at least a first portion of the recirculated gas flow 50 such that combustion may proceed in the turbine combustor 32 without a lean blow-out.

Additionally, each element of equipment described above in the section "Power Plant Arrangement" may influence constant speed no load operation. At constant speed no load operation, the turbine 34 is rotating at a constant speed but the turbine generator 20 is not engaged to generate electricity. The main air compressor 12 may have inlet guide vanes set to allow the minimum flow necessary to match or exceed the pressure of the flow from the turbine compressor 30. The turbine compressor 30 may have inlet guide vanes set to allow the minimum flow necessary to provide any necessary remainder flow not provided by the main air compressor 12 to the turbine combustor 32. The variable bleed valve 14 may be closed. The inter-train valve 16 may be closed. The fuel flow rate of the fuel stream 28 may be set in conjunction with the combination of the flow rates of the at least a first portion of the compressed ambient gas flow 26 and the at least a first portion of the recirculated gas flow 50 to provide sufficient turbine power through combustion. Additionally, an excess portion of the recirculated gas flow 50 may be vented from the gas turbine assembly so that the assembly does not over-pressurize.

In some embodiments, discussed in detail below, a bypass conduit 49 may be used to "bleed" extra pressure from the turbine compressor 30 as a bypass flow. The bypass flow may be regulated by a turbine bypass valve 47. The flow across the turbine 34 may be equal to the flow rate from the turbine compressor 30 multiplied by one minus the turbine bypass valve opening percentage, plus the flow rate of the at least a first portion of the compressed ambient gas flow 26 plus the flow rate of the fuel stream 26. The turbine power may then be equal to the flow across the turbine 34 multiplied by the specific work extracted across the turbine 34. The specific work extracted from the turbine 34 may be proportional to the pressure and temperature drop across the turbine 34. The temperature drop across the turbine section may be influenced by the turbine 34 inlet temperature, which may be influenced by the fuel flow into the turbine combustor 32.

In operation, ambient air may be compressed with the main air compressor 12 to make at least a first portion of a compressed ambient gas flow 26 having a compressed ambient gas flow rate. In some embodiments, the inlet guide vanes to the main air compressor 12 may be used to control the compressed ambient gas flow rate and may be adjusted to a range of about 30° to about 55°, from about 35° to about 50°, or from about 40° to about 45°. The at least a first portion of the compressed ambient gas flow 26 may be delivered from the main air compressor 12 to the turbine combustor 32 and the flow may be further regulated by an air injection valve 25. In some embodiments, the flow of the at least a first portion of the compressed ambient gas flow 26 may additionally be regulated by the variable bleed valve 14. The compressed ambient gas flow rate may be adjusted to control the pressure at which the compressed ambient gas flow 26 is delivered to the turbine combustor 32.

The at least a first portion of the compressed ambient gas flow 26 may be delivered from the main air compressor 12 to the turbine combustor 32 at a pressure that is greater than or substantially equal to an output pressure that is delivered to the turbine combustor 32 from a turbine compressor 30 as at least a first portion of a recirculated gas flow 50 having a recirculated low oxygen content gas flow rate. A fuel stream 28 may also be delivered to the turbine combustor 32 with a fuel flow rate. In embodiments, the fuel flow rate, the compressed ambient gas flow rate, and the recirculated gas flow rate may be sufficient to maintain combustion in the turbine combustor 32.

The at least a first portion of a recirculated gas flow 50 has a flow rate that may be adjusted. Adjusting the flow rate of the at least a first portion of the recirculated gas flow 50 may control the output pressure that is delivered from the turbine compressor 30 to the turbine combustor 32. In some embodiments, the inlet guide vanes of the turbine compressor 30 may be used to adjust the recirculated low oxygen content flow rate and pressure. In some embodiments, the inlet guide vanes of the turbine compressor 30 may be adjusted to a range of about 35° to about 65°, about 40° to about 60°, or about 45° to about 55°.

In some embodiments, the fuel flow rate of the fuel stream 28 may be regulated by a gas control valve 27 to give a fuel flow rate in the range of about 10 pps to about 30 pps, about 15 pps to about 25 pps, or from about 18 pps to about 22 pps. As used herein, the term "pps" means pounds per second and specifies a flow rate by mass.

The at least a first portion of the compressed ambient gas flow 26 may be mixed, in the turbine combustor 32, with at least a first portion of the recirculated gas flow 50 and with the fuel stream 28 to form a combustible mixture. The combustible mixture may then be ignited and burned in the turbine combustor 32, thereby forming the recirculated gas flow 50 and driving both the turbine 34 and the turbine compressor 30, and producing a turbine power that is substantially equal to at least the power required to rotate the turbine compressor 30. As used herein, the term "driving" means that both the turbine 34 and the turbine compressor 30 rotate. Thus, the burning of the combustible mixture may produce a turbine power that is substantially equal to at least a power required to rotate the turbine compressor.

At least a portion of the recirculated gas flow 50 may be recirculated through a recirculation loop 52. The recirculation loop 52 may fluidly connect an output of the turbine 34 with an input of the turbine compressor 30. The recirculated gas flow 50 may further pass through the heat recovery steam generator 36, the recirculated gas flow cooler 40, and the turbine blower 42 en route from the output of turbine 34 to the input of turbine compressor 30.

In some embodiments, the recirculated gas flow 50 may be directed through the heat recovery steam generator 36 for the generation of steam. A steam turbine may be further configured to generate additional electricity using the steam from the heat recovery steam generator 36, and the steam turbine may be connected to a steam generator. In some embodiments, the heat recovery steam generator 36 may be configured to generate additional electricity when the temperature of the recirculated gas flow 50 is in the range from about 200° C. to about 700° C., from about 260° C. to about 600° C., or from about 300° C. to about 550° C. In some embodiments, the steam turbine may be connected to the turbine shaft 22.

An excess portion of the recirculated gas flow 50 may be vented from the system at a location between an output of the turbine compressor 30 and an input to the turbine compressor 30. The venting step may be used to prevent over-pressurization of the gas turbine assembly. In some embodiments, the venting step may be used to reduce the pressure of the recirculated gas flow 50 that is delivered from the turbine compressor 30 to the turbine combustor 32. In some embodiments, the method of venting may further comprise opening a damper door 38, which may be fluidly connected to the recirculation loop 52, to the atmosphere.

In some embodiments, at least a second portion of an exhaust of turbine compressor 30 may bypass the turbine combustor 32 via the bypass conduit 49. As used herein, the "exhaust" of the turbine compressor 30 is an output of the compressed recirculated gas flow 50 from the turbine compressor 30. Additionally, the bypass conduit 49 may deliver the bypass flow to the recirculation loop 52 downstream of the turbine 34. In some embodiments, the exhaust of the turbine compressor 30 may bypass the turbine combustor 32 as a bypass flow having a bypass flow rate, wherein the bypass flow rate may be adjusted. In some embodiments, the bypass flow rate may be adjusted using the turbine bypass valve 47. In some embodiments, the turbine bypass valve 47 may be configured to deliver the bypass flow with the bypass flow rate in the range of about 20% to about 80%, from about 30% to about 70%, or from about 40% to about 60% of the output flow rate of the turbine compressor 30.

In some embodiments, a portion of the bypass flow into the bypass conduit 49 may be extracted as an extraction flow 48 and may be regulated by an extraction valve 45. In some embodiments, the extraction valve 45 may be fluidly connected to the bypass conduit 49 at a point that is either upstream of or downstream of the turbine bypass valve 47. In some embodiments, the bypass flow may be delivered to a second process. In some embodiments, at least a portion of the bypass flow may be delivered to a gas separation system. In some embodiments, the bypass extraction valve 45 may be fluidly connected to a gas separation system such as a carbon capture sequestration (CCS) system via the extraction flow 48. In still other embodiments, the gas separation system may produce a stream of concentrated carbon dioxide and concentrated nitrogen, both with a low oxygen content.

In some embodiments, the at least a first portion of the compressed ambient gas flow 26 may be delivered to the turbine combustor 32 at a pressure that may be substantially equal to an output pressure from the turbine compressor 30 to the turbine combustor 32. As used herein, the term "substantially equal" means a pressure difference that is less than about 10%, less than about 5%, or less than about 1%. In some embodiments, the at least a first portion of the compressed ambient gas flow 26 may be delivered to the turbine combustor 32 at a pressure that may be greater than or substantially equal to an output pressure from the turbine compressor 30 to the turbine combustor 32.

In some embodiments, the turbine shaft 22 may connect the turbine 34 to the turbine compressor 30. Under constant speed no load operation, the turbine power that is produced by burning the combustible mixture may be substantially equal to the power necessary to rotate the turbine compressor 30. In other embodiments, the turbine shaft 22 may further connect to the main air compressor 12, wherein the turbine power that is produced by burning the combustible mixture may be substantially equal to the power necessary to rotate both the turbine compressor 30 and the main air compressor 12.

In some embodiments, the gas turbine assembly may further comprise a secondary flow path 31 that may deliver at least a third portion of the recirculated gas flow 50 from the turbine compressor 30 to the turbine 34 as a secondary flow. The secondary flow may be used to cool and seal the turbine 34, including individual components of the turbine 34 such as the turbine shroud, the turbine nozzle, the turbine blade tip, the turbine bearing support housing, and the like. After cooling and sealing the turbine 34 and any individual turbine components, the secondary flow may be directed into the recirculation loop 52 near the output of the turbine 34.

In still other embodiments, a method for operating the exemplary power plant configuration 100 at constant speed no load is provided and may further include the use of the booster compressor 24 which may be incorporated downstream of and in fluid connection with the main air compressor 12 and upstream of and in fluid connection with the turbine combustor 32. The booster compressor 24 may further compress the at least a first portion of the compressed ambient gas flow 26 before delivery into the turbine combustor 32. The exhaust of the booster combustor 24 may be delivered to the turbine combustor 32. In some embodiments, the exhaust of the booster compressor 24 may be regulated by the air injection valve 25.

In some embodiments, the method comprises operating a power plant arrangement that comprises one gas turbine assembly. In other embodiments, the method comprises operating a power plant arrangement that comprises two gas turbine assemblies that are fluidly connected by the inter-train conduit 19. As used herein, the term "inter-train conduit" may refer to a fluid connection between two or more gas turbine assemblies and one or more main air compressors. In still other embodiments, the method comprises operating a power plant arrangement that comprises three or more gas turbine assemblies and one or more additional main air compressors, wherein the additional main air compressors are in fluid connection with each other and with the gas turbine assemblies. In yet other embodiments, the method comprises operating a power plant arrangement that is configured for substantially stoichiometric combustion. In still other embodiments, the method comprises operating a power plant arrangement that is configured for substantially zero emissions power production.

Other configurations and methods of operation are provided by U.S. patent applications including "Power Plant and Method of Use" to Daniel Snook, Lisa Wichmann, Sam Draper, and Noemie Dion Ouellet (filed Aug. 25, 2011), "Power Plant and Method of Operation" to Daniel Snook, Lisa Wichmann, Sam Draper, Noemie Dion Ouellet, and Scott Rittenhouse (filed Aug. 25, 2011), "Power Plant Start-Up Method" to Daniel Snook, Lisa Wichmann, Sam Draper, Noemie Dion Ouellet, and Scott Rittenhouse (filed Aug. 25, 2011), "Power Plant and Control Method" to Daniel Snook, Lisa Wichmann, Sam Draper, and Noemie Dion Ouellet (filed Aug. 25, 2011), "Power Plant and Method of Operation" to Predrag Popovic (filed Aug. 25, 2011), "Power Plant and Method of Operation" to Sam Draper and Kenneth Kohl (filed Aug. 25, 2011), "Power Plant and Method of Operation" to Sam Draper (filed Aug. 25, 2011), "Power Plant and Method of Operation" to Sam Draper (filed Aug. 25, 2011), "Power Plant and Method of Operation" to Lisa Wichmann (filed Aug. 25, 2011), and "Power Plant and Control Method" to Karl Dean Minto (filed Aug. 25, 2011), the disclosures of which are incorporated by reference herein.

It should be apparent that the foregoing relates only to the preferred embodiments of the present invention and that numerous changes and modifications may be made herein without departing from the spirit and the scope of the invention as defined by the following claims and equivalents thereof.

We claim:

1. A method for operating a power plant, comprising: compressing ambient air with at least one main air compressor to make a compressed ambient gas flow having a compressed ambient gas flow rate; delivering at least a first portion of the compressed ambient gas flow from the at least one main air compressor to a turbine combustor at a pressure that is greater than or substantially equal to an output pressure delivered to the turbine combustor from a turbine compressor of at least a first portion of a recirculated gas flow having a recirculated gas flow rate; delivering a fuel stream to the turbine combustor with a fuel flow rate, wherein the fuel flow rate, the compressed ambient gas flow rate, and the recirculated gas flow rate are sufficient to maintain combustion; mixing the at least a first portion of the compressed ambient gas flow with the at least a first portion of the recirculated gas flow and with the fuel stream in the turbine combustor to form a combustible mixture; burning the combustible mixture in the turbine combustor to form the recirculated gas flow; driving a turbine shaft using the recirculated gas flow, such that the turbine and the turbine compressor rotate, and produce a turbine power that is at least a power sufficient to rotate the at least one main air compressor and the turbine compressor, wherein the turbine shaft mechanically connects the turbine, turbine compressor, and the at least one main air compressor; recirculating at least a portion of the recirculated gas flow through a recirculation loop, wherein the at least a portion of the recirculated gas flow is recirculated from the turbine to the turbine compressor; delivering a secondary flow through a secondary flow path, wherein the secondary flow path delivers at least a second portion of the recirculated gas flow from the turbine compressor to the turbine for cooling and sealing the turbine and thereafter into the recirculation loop; and venting an excess portion of the recirculated gas flow from a first vent or venting an excess portion of the compressed ambient gas flow from a second vent, wherein the first vent is located between an output of the turbine compressor and an input to the turbine compressor and wherein the second vent is located between an output of the at least one main air compressor and an input to the turbine combustor such that the compressed ambient gas flow is delivered to the turbine combustor at the pressure that is greater than or substantially equal to the output pressure delivered to the turbine combustor from the turbine compressor; wherein the power plant is operated at constant speed no-load.

2. The method of claim 1, further comprising delivering the at least a first portion of the compressed ambient gas flow from the at least one main air compressor to a booster compressor, wherein the booster compressor is fluidly connected to the downstream side of the at least one main air compressor and is fluidly connected to the upstream side of the turbine combustor, and delivering a booster compressor exhaust to the turbine combustor.

3. The method of claim 1, further comprising adjusting a plurality of inlet guide vanes of the at least one main air compressor to regulate the pressure of the at least a first portion of the compressed ambient gas flow that is delivered to the turbine combustor.

4. The method of claim 1, further comprising adjusting a plurality of inlet guide vanes of the turbine compressor to regulate the output pressure delivered to the turbine combustor from the turbine compressor as the at least a first portion of the recirculated gas flow.

5. The method of claim 1, further comprising adjusting the fuel flow rate.

6. The method of claim 1, wherein a first valve or a second valve is adjusted such that the output pressure delivered to the turbine combustor from the turbine compressor is less than or equal to the pressure of the at least a first portion of the compressed ambient gas flow delivered to the turbine combustor from the at least one main air compressor.

7. The method of claim 1, further comprising passing the recirculated gas flow from the turbine to a heat recovery steam generator in the recirculation loop, wherein the heat recovery steam generator is configured to generate electricity using a steam turbine and a steam generator.

8. The method of claim 1, wherein a bypass flow is fluidly connected to the turbine compressor and is delivered to the recirculation loop downstream of the turbine.

9. The method of claim 8, wherein the bypass flow is fluidly connected to an extraction valve and at least a portion of the bypass flow is delivered to a second process.

10. A method for operating a power plant, comprising: compressing ambient air with at least one main air compressor to make a compressed ambient gas flow having a compressed ambient gas flow rate; delivering at least a first portion of the compressed ambient gas flow from the at least one main air compressor to a turbine combustor; mixing the at least a first portion of the compressed ambient gas flow with the at least a first portion of a recirculated gas flow and with a fuel stream, to form a combustible mixture in the turbine combustor; burning the combustible mixture in the turbine combustor to form the recirculated gas flow; driving a turbine connected to the turbine combustor using the recirculated gas flow, such that the turbine and a turbine compressor rotate and produce a turbine power; recirculating at least a portion of the recirculated gas flow through a recirculation loop, wherein the at least a portion of the recirculated gas flow is recirculated from the turbine to the turbine compressor; delivering a secondary flow through a secondary flow path, wherein the secondary flow path delivers at least a second portion of the recirculated gas flow from the turbine compressor to the turbine for cooling and sealing the turbine and thereafter into the recirculation loop; and venting an excess portion of the recirculated gas flow from a first vent or venting an excess portion of the compressed ambient gas flow from a second vent, wherein the first vent is located between an output of the turbine compressor and an input to the turbine compressor and the second vent is located between an of the at least one main air compressor and an input of the turbine combustor such that the compressed ambient gas flow is delivered to the turbine combustor at a first pressure that is greater than or substantially equal to a second pressure delivered to the turbine combustor from the turbine compressor.

11. The method of claim 10, further comprising delivering the at least a first portion of the compressed ambient gas flow from the at least one main air compressor to a booster compressor, wherein the booster compressor is fluidly connected to the downstream side of the at least one main air compressor and is fluidly connected to the upstream side of the turbine combustor, and delivering a booster compressor exhaust to the turbine combustor.

12. The method of claim 10, wherein a bypass flow is fluidly connected to and delivered to the recirculation loop downstream of the turbine.

13. The method of claim 10, wherein the turbine power is used to rotate a turbine shaft configured to generate electricity when rotated in a turbine generator.

14. The method of claim 13, wherein electricity is generated using substantially stoichiometric combustion.

15. The method of claim 13, further comprising bypassing the turbine combustor with at least a third portion of the recirculated gas flow as a bypass flow having a bypass flow rate.

16. The method of claim 13, wherein the power plant is operated at constant speed no-load.

17. A method for operating a power plant, comprising: compressing ambient air with at least one main air compressor to make a compressed ambient gas flow having a compressed ambient gas flow rate; delivering at least a first portion of the compressed ambient gas flow from the at least one main air compressor to a turbine combustor at a pressure that is greater than or substantially equal to an output pressure delivered to the turbine combustor from a turbine compressor of at least a first portion of a recirculated gas flow having a recirculated gas flow rate; mixing the at least a first portion of the compressed ambient gas flow with the at least a first portion of the recirculated gas flow and with a fuel stream in the turbine combustor to form a combustible mixture; burning the combustible mixture in the turbine combustor to form the recirculated gas flow, the recirculated gas flow driving a turbine connected to the turbine combustor; recirculating at least a portion of the recirculated gas flow through a recirculation loop, wherein the at least a portion of the recirculated gas flow is recirculated from the turbine to the turbine compressor; and venting an excess portion of the recirculated gas flow from a first vent or venting an excess portion of the compressed ambient gas flow from a second vent, wherein the first vent is located between an output of the turbine compressor and an input to the turbine compressor and wherein the second vent is located between an output of the at least one main air compressor and an input to the turbine combustor such that the compressed ambient gas flow is delivered to the turbine combustor at the pressure that is greater than or substantially equal to the output pressure delivered to the turbine combustor from the turbine compressor; wherein the power plant is operated at constant speed no-load.

\* \* \* \* \*